3,232,357
HARROWS
Cornelis van der Lely, Zug, Switzerland, and Leendert van Wingerden, Dubbeldam, Netherlands, assignors to C. van der Lely N.V., Maasland, Netherlands, a Dutch limited-liability company
Filed Dec. 11, 1962, Ser. No. 243,927
Claims priority, application Netherlands, Jan. 4, 1962, 273,199
9 Claims. (Cl. 172—643)

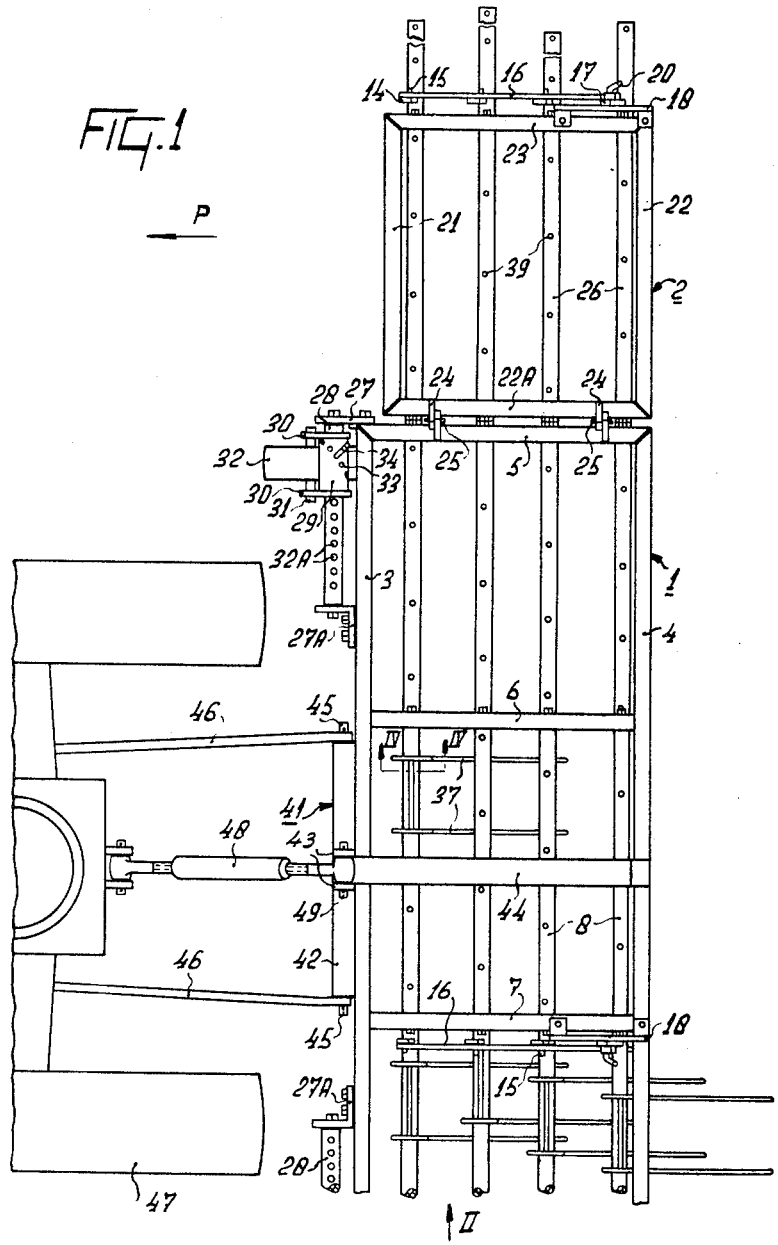

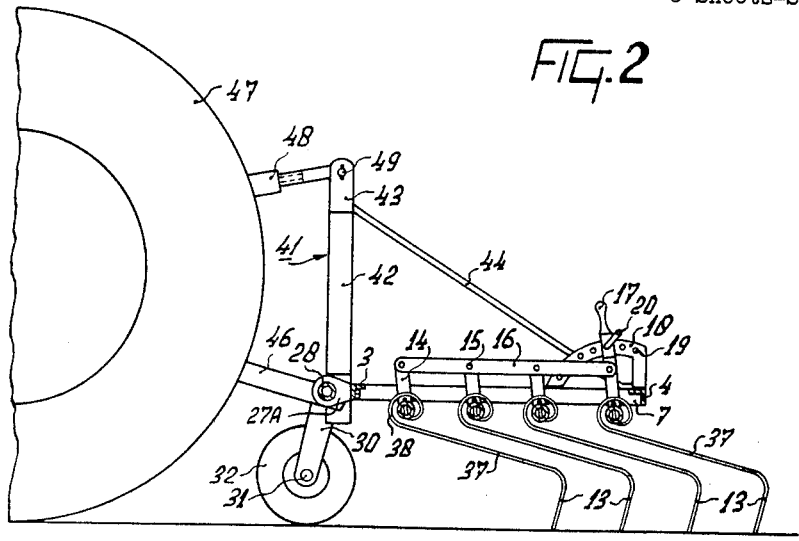

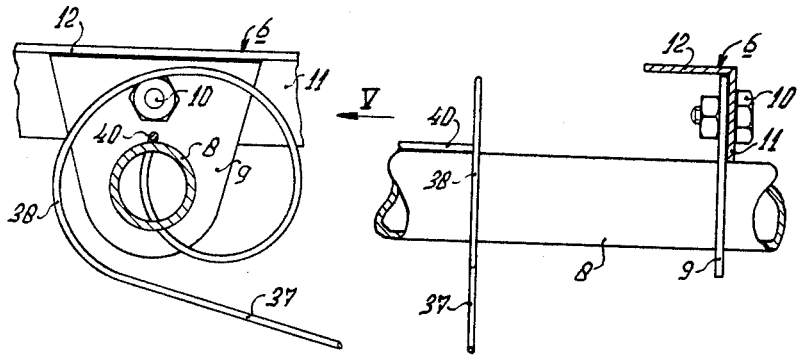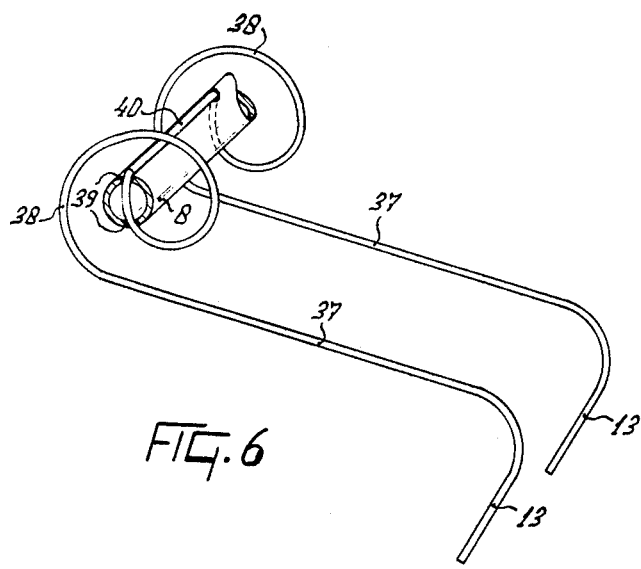

This invention relates to harrows.

An object of the invention is the provision of a simple but versatile harrow which may be used for the weeding of growing crops.

According to the invention, there is provided a harrow comprising a frame movable over the ground and a number of rows of resilient tines carried by the frame which rows, considered in the intended direction of travel of the harrow, are disposed one behind the other, wherein each tine has a soil-working portion that is coupled to the frame by a connecting portion whose length, in plan view, is greater than the perpendicular distance between two neighboring rows of tines.

For a better understanding of the invention, and to show how the same may be carried into effect, reference will now be made, by way of example, to the accompanying drawings, in which:

FIGURE 1 is a plan view of a harrow in accordance with the invention connected to the rear of a tractor, FIGURE 2 is a side elevation as seen in the direction indicated by the arrow II of FIGURE 1, FIGURE 3 is a sectional elevation, to an enlarged scale, showing an alternative embodiment of part of the harrow illustrated in FIGURES 1 and 2, FIGURE 4 is a section, to an enlarged scale, taken on the line IV—IV of FIGURE 1, FIGURE 5 is a view as seen in the direction indicated by the arrow V of FIGURE 4, and FIGURE 6 is a perspective view corresponding generally to FIGURES 4 and 5.

The harrow which is illustrated in FIGURES 1 and 2 has a central tined frame 1 which is flanked on one side by a smaller tined frame 2 and on the opposite side by a tined frame which is symmetrically identical with the frame 2 but which is not illustrated in the drawings. The larger central frame 1 includes two beams 3 and 4 which extend transverse to the intended direction of travel P of the harrow and which are spaced apart in that direction. Four beams extending parallel to the direction P interconnect the beams 3 and 4 but only three of them that are designated by the reference numerals 5, 6 and 7 are illustrated in FIGURE 1. The beam 5 and also the fourth beam which is not illustrated interconnect the opposite ends of the beams 3 and 4. Each of the beams 3 to 7, and also the beam which is not illustrated, is of L-shaped cross-section, one limb 12 of the L being horizontally disposed whereas the other limb 11 (FIGURES 4 and 5) projects vertically downwardly from the limb 12. The frame 1 also includes four equally spaced tubular tine supports 8 which extend parallel to the beams 3 and 4 and which are journalled in holes in approximately triangular plates 9. The plates 9 (FIGURES 4 and 5) are secured to the vertical limbs 11 of the beams 5 to 7 by means of single bolts 10. The straight uppermost edge of each of the plates 9 bears against the underside of the horizontal limb 12 of the corresponding beam so that the said plate cannot turn about the bolt 10 by which it is secured to that beam.

As can be seen in FIGURE 2, each tine support 8 is provided, adjacent the beam 7, with an upwardly projecting arm 14. The uppermost ends of the arms 14 are all connected by horizontal pivot pins 15 to a strip 16 which extends parallel to the beam 7. The rearmost arm 14 is extended upwardly to form a handle 17 by which all the tine supports 8 can be turned about their own longitudinal axes. A curved strip 18 is disposed alongside the handle 17 and has its opposite ends secured to the beams 4 and 7, respectively. The handle 17 carries a spring-loaded horizontal locking pin 20 whose tip can enter any one of a number of holes 19 formed along the curved strip 18. It will be apparent that the parts 14 to 20 constitute an adjusting mechanism by which the angular settings of the tine supports 8 can be varied and by which a chosen setting can be maintained.

The tined frame 2 is of similar construction to the frame 1 and is turnable relative to the latter about an axis afforded by pivot pins 25 extending parallel to the direction P. The pivot pins 25 are journalled in hinge parts 24 projecting from the beam 5 and from a similar beam 22A of the frame 2. The frame 2 comprises two beams 21 and 22 extending parallel to the beams 3 and 4 and two interconnecting beams 22A and 23 extending parallel to the beams 5, 6 and 7. The beams 22A and 23 are a little shorter than the beams 5, 6 and 7 so that, since the beam 22 is in alignment with the beam 4, the beam 21 is located a short distance to the rear of the beam 3 with respect to the intended direction of travel P. The frame 2 also includes tine supports 26 which are similar to, and in register with, the supports 8 of the frame 1. However, the tine supports 26 project beyond the beam 23 over different distances, the projecting portions being provided with an adjusting member substantially identical to, and usable in the same way as, the adjusting mechanism of the frame 1.

Two relatively spaced lugs 27 and 27A project forwardly of the beam 3 from locations adjacent one end thereof. A tubular support 28 is fastened to the lugs 27 and 27A so as to extend parallel to the beam 3 and a sleeve 29 is mounted on the support 28 so as to be movable both axially and turnably relative thereto. Two strips 30 are secured to the opposite ends of the sleeve 29 and project radially of the support 28. The ends of the strips remote from the sleeve 29 are interconnected by a horizontal axle 31 upon which a ground wheel 32 is rotatably mounted. The tubular support 28 is formed with a longitudinally extending row of vertical transverse holes 32A while the sleeve 29 is formed with a helical row of transverse holes 33 any one of which can be brought into register with a chosen one of the holes 32A. A locking pin 34 is provided for entry through a registering pair of holes 32A and 33 and it will be apparent that, by appropriate choice of these holes, the ground wheel 32 can be retained in a desired setting axially of the support 28 and also a desired angular setting about the support 28. A second ground wheel is mounted at the end of the beam 3 remote from the ground wheel 32 in a symmetrically identical manner.

FIGURE 3 illustrates an alternative arrangement in which the tubular support 28 is rotatably journalled in the lugs 27 and 27A and carries an upwardly directed arm 35 whose uppermost end is connected by a pivot pin 15 to the leading end of a strip 36 which is longer than, but otherwise the same as, the previously described strip 16. It will be apparent that, when this arrangement is employed, alteration of the setting of the adjusting mechanism will effect an alteration in the angular setting of the ground wheel 32 about the longitudinal axis of the support 28. It will be understood that, when the previously described adjusting mechanism is modified in the manner illustrated in FIGURE 3, it must be disposed in alignment with one of the supports 28 instead of occupying the position illustrated in FIGURE 1. Moreover, since the harrow has two ground wheels, it is necessary to provide two adjusting mechanisms in alignment with the corresponding supports 28 although, if desired, the parts 17 to 20 (FIGURE 2) of the second adjusting mechanism may be omitted. An adjustment of the setting of the ground wheel 32 axially of the support 28, that is to say, in a direction transverse to the direction P, is effected in the same way when the construction illustrated in FIGURE 3 is employed as when the construction illustrated in FIGURES 1 and 2 is employed.

It can be seen from the drawings that each of the tine supports 8 and 26 is formed with a channel means comprising passageways or holes 39 through which resilient tines are entered. Each tine has a soil-working portion 13 of about 14 centimeters in length, this portion being linked to the corresponding support 8 or 26 by a straight connecting portion 37 and a curved connecting portion 38. Each straight connecting portion 37 is disposed approximately perpendicular to the corresponding soil-working portion 13 and has a length of about 36 centimeters. It extends, in plan view, substantially parallel to the direction P and the curved connecting portion 38, which is disposed at its leading end, is bent through at least half a turn to embrace an angle of 180° or more. In plan view, the length of each connecting portion 37 is approximately equal to, or greater than, twice the perpendicular distance between the rows of soil-working portions 13 which distance is approximately the same as the perpendicular distance between neighboring tine supports 8 or 26.

As can be seen in FIGURE 6, the tines are formed in integral pairs from single lengths of spring steel wire or rod. This arrangement simplifies the construction of the tines. The holes 39 in the supports 8 and 26 through which the tines are entered are shaped and arranged in such a way that the said tines can be brought readily to their operative positions by entering them, tips first, through the said holes 39. When the operative position is reached, as illustrated in FIGURE 6, a bridge 40 which joins the ends of the two curved connecting portions 38 of a pair of tines rests against the corresponding support 8 or 26. Obviously, the radius of curvature of the portions 38 and that of the bends interconnecting the portions 13 and 37 is such that these parts can pass readily through the holes 39. The tines can be connected to, and disconnected from, their supports without difficulty when the construction described is employed.

In the arrangement illustrated in FIGURE 3, the bridge 40 interconnecting two tines is disposed in front of the corresponding support 8 with the curved connecting portions 38 wound around the said support. However, the alternative arrangement which can be seen in FIGURES 4 and 6 may be employed in which the bridge 40 is disposed over and above the corresponding support 8. In this case, the holes 39 through which the connecting portions 38 are entered are disposed in uppermost and lowermost regions of the support 8 so that any rain or other moisture which finds its way into the interior of a tubular support 8 or 26 can drain away readily through the lowermost holes 39. The tine supports 8 and 26 may be detached from the harrow frames to facilitate the mounting or removal of the tines and this is accomplished readily merely by removing the bolts 10 to release the plates 9.

Two strips which are generally indicated by the reference numeral 41 have their lowermost ends secured to the front of the beam 3 at equal distances on the opposite sides of the mid-point of that beam. Each strip 41 has an upwardly inclined portion 42 which terminates in an upper vertical portion 43. The two parallel portions 43 of the strips 41 are connected by a further inclined strip 44 to the mid-point of the beam 4. The lowermost ends of the strips 41 are provided with horizontally aligned pins 45 to which the free ends of the lower lifting links 46 of the three-point lifting device of a tractor 47 or other propelling vehicle can be connected as shown in FIGURES 1 and 2. The free end of the adjustable upper lifting link 48 of the three-point lifting device is pivotally connected to the vertical portions 43 of the strips 41 by means of a horizontal pivot pin 49.

In the use of the harrow, it is moved over the ground in the direction indicated by the arrow P in FIGURE 1 with the tines disposed in substantially the manner which can be seen best in FIGURE 2. The soil-working portions 13 of the tines are dragged through the soil and, due to the flexible construction and substantial length of the portions 37 and 38, they are capable of deflecting readily to avoid immovable obstacles buried in the soil. It will be noted from FIGURE 1 that the holes 39 formed in the various tine supports 8 and 26 are staggered in a direction perpendicular to the direction P so that tines in succeeding rows work different narrow strips of land. The flexibility of the tines makes the harrow particularly suitable for removing weeds from rows of growing crop. The relatively small weeds are pulled up by the soil-working portions 13 of the tines whereas these portions deflect when they encounter the relatively well-rooted crop without causing any appreciable damage to the latter.

The harrow is also suitable for weeding potato ridges. The adjusting mechanisms can be brought to settings in which the soil-working portions 13 bear relatively lightly against the ridges so that the ridges are not damaged but still with sufficient intensity to remove small weeds from the strips of soil lying between the ridges. The adjusting mechanisms can be used to bring the tines to setting which are appropriate to the consistency of the soil to be worked and also to the general state of cleanliness thereof. The connecting portions 37 of the tines will, however, normally not be inclined to the ground surface at an angle greater than 60°. The depth of penetration of the soil-working portions 13 can also be influenced by adjusting the angular settings of the ground wheels 32 about the supports 28. It will be apparent that this adjustment can be made without altering the angle of attack of the tines. It is necessary to be able to move the ground wheels 32 axially of the supports 28 in order to be able to arrange the said ground wheels in settings which are appropriate to the spacing between rows of crops so that the said ground wheels shall not damage the crops.

When it is desired to move the harrow from one place to another without performing any working operation, the frame 2 and the symmetrical frame which is not illustrated in the drawings are both turned about the pivot pins 25 through an angle substantially in excess of 90° so that they lie more or less inverted on the top of the central frame 1. No locking device is necessary to maintain them in this position. Once the width of the harrow has been reduced by performing the operation just described, the whole harrow is lifted clear of the ground with the aid of the lifting device of the tractor 47. In the harrow which has been described, the plates 9 in which the tine supports 8 and 26 are journalled are secured to the various beams with the aid of single bolts 10. However, if desired, the bolts 10 may be replaced by known or other suitable quick release fastenings.

What we claim is:

1. A harrow comprising a frame movable over the ground, supports carried by said frame, and a plurality of resilient tines connected to said supports, said tines including soil-working portions and connecting portions, and holes included in said supports, wherein the arrangement is such that said soil-working portions of the tines are linked to said support solely by entering said connecting portions of the tines through said holes formed in the supports, said tines being formed in integral groups, each of said groups being linked to one of said supports solely by entering said tines through said holes formed in that support, each of said groups including two tines interconnected by a bridge extending adjacent said support transverse to the intended direction of travel.

2. A tine in a harrow which includes tine support means having a passageway for receiving said tine, said tine being composed of a resilient material and of proportions whereby it is penetrable through said passageway, said tine comprising a soil-working portion which in operation is disposed substantially normal to the ground, a first connecting portion which in operation extends from the upper part of said soil-working portion substantially forwardly in the direction of travel, a second connecting portion which in operation is curved upwardly and rearwardly from the forward part of said first connecting portion above and at least partly around said support means to engage said passageway, restrictive means incorporated at the end of said second connecting portion opposite said first connecting portion for restraining relative movement between said passageway and said tine.

3. A tine in a harrow which includes tine support means with a passageway for receiving said tine, said tine being composed of resilient material and of proportions whereby it is penetrable through said passageway, said tine comprising a soil-working portion which in operation is disposed substantially normal to the ground, a first connecting portion which in operation extends from the upper part of said soil-working portion substantially forwardly in the direction of travel, a second connecting portion which in operation is curved upwardly and rearwardly from the forward part of said first connecting portion above and around said support means to engage said passageway, said latter engaged part of said tine in frictional gripping relationship with said passageway, restrictive means incorporated at the end of said second connecting portion opposite said first connecting portion for restraining relative movement between said passageway and said tine.

4. A tine as claimed in claim 3 wherein said restrictive means comprises a bent-over portion.

5. A tine as claimed in claim 4 wherein there is a second similar tine adjacent to said tine, the bent-over portions of each of said tines being integral.

6. A tine in a harrow which includes tine support means having a substantially vertical passageway for receiving said tine, said tine being composed of a resilient material and of proportions whereby it is penetrable through said passageway, said tine comprising a soil-working portion which in operation is disposed substantially normal to the ground, a first connecting portion which in operation extends from the upper part of said soil-working portion substantially forwardly in the direction of travel, a second connecting portion which in operation curves upwardly and rearwardly from the forward part of said first connecting portion above and at least partly around said support means to engage initially said passageway in the latter's lower part, restrictive means incorporated at the end of said second connecting portion opposite said first connecting portion for restraining relative movement between said passageway and said tine.

7. A tine in a harrow which includes tine support means with a substantially vertical passageway for receiving said tine, said tine being composed of a resilient material and of proportions whereby it is penetrable through said passageway, said tine comprising a soil-working portion which in operation is disposed substantially normal to the ground, a first connecting portion which in operation extends from the upper part of said working portion substantially forwardly in the direction of travel, a second connecting portion which in operation is curved upwardly and rearwardly from the forward part of said first connecting portion above and around said support means to engage initially said passageway in its lower part, said latter engaged part of said tine being in frictional gripping relationship with said passageway, restrictive means incorporated at the end of said second connecting portion opposite said first connecting portion restraining relative movement between said passageway and said tine.

8. A tine as claimed in claim 7 wherein said restrictive means comprises a bent-over portion.

9. A tine as claimed in claim 8 wherein there is a second tine similar to said tine adjacent thereto, said bent-over portions of said tines being integral.

References Cited by the Examiner
UNITED STATES PATENTS

| | | | |
|---|---|---|---|
| Re. 9,561 | 2/1881 | Rogers | 172—776 |
| 117,595 | 8/1871 | Benson | 172—776 |
| 182,736 | 9/1876 | Reynolds | 172—707 |
| 649,124 | 5/1900 | Campbell | 172—707 |
| 700,214 | 5/1902 | Macphail | 172—643 |
| 811,517 | 1/1906 | McCune | 172—707 |
| 1,243,203 | 10/1917 | Nelson | 172—635 |
| 2,090,739 | 8/1937 | Wyss | 172—707 |
| 2,236,780 | 4/1941 | Oerman | 172—635 |
| 2,317,841 | 4/1943 | Wittrock | 172—421 |
| 2,553,522 | 5/1951 | Watmough | 172—421 |
| 2,800,758 | 7/1957 | Schmied | 172—456 |
| 2,990,893 | 7/1961 | Bland | 172—456 |

ABRAHAM G. STONE, *Primary Examiner.*

T. GRAHAM CRAVER, *Examiner.*